United States Patent [19]
Wölker et al.

[11] Patent Number: 5,784,357
[45] Date of Patent: Jul. 21, 1998

[54] PACKET SWITCHING SYSTEM

[75] Inventors: Roland Wölker, Espoo, Finland; Peter Nagel, Erlangen, Germany

[73] Assignee: U.S. Philips Corporation, New York, N.Y.

[21] Appl. No.: 526,019

[22] Filed: Sep. 8, 1995

[30] Foreign Application Priority Data

Sep. 9, 1994 [DE] Germany ............... 44 32 061.2

[51] Int. Cl.$^6$ .................. H04L 1/22; H04J 12/56
[52] U.S. Cl. .................. 370/218; 370/394; 370/399
[58] Field of Search .................. 370/16, 13, 60, 370/60.1, 58.1, 58.2, 58.3, 394, 399, 218, 219, 387, 390, 428, 429; 395/182.02, 184.01; 340/827, 825.01

[56] References Cited

U.S. PATENT DOCUMENTS

| | | | |
|---|---|---|---|
| 4,791,606 | 12/1988 | Threewitt et al. | 365/49 |
| 5,285,441 | 2/1994 | Bansal et al. | 370/16 |
| 5,315,581 | 5/1994 | Nakano et al. | 370/16 |
| 5,339,311 | 8/1994 | Turner | 370/60 |
| 5,430,720 | 7/1995 | Larsson et al. | 370/60 |
| 5,436,886 | 7/1995 | McGill | 370/16 |

FOREIGN PATENT DOCUMENTS 0384936  5/1990  European Pat. Off. ........ H04L 12/56

OTHER PUBLICATIONS

"Halbeiter–Schaltungstechnik" by U. Tietze and Ch. Schenk, 9th impression, 1990, Springer–Verlag, pp. 228–229.

*Primary Examiner*—Wellington Chin
*Assistant Examiner*—Soon-Dong Hyun
*Attorney, Agent, or Firm*—Steven R. Biren

[57] ABSTRACT

The invention relates to a packet switching system comprising a plurality of inlet circuits which are used each for multiplying a cell coming in by an inlet line, which are provided for transmission via different switches and for producing a time stamp to be supplied with each cell, and the system comprising a plurality of outlet circuits used for selecting a cell to be conveyed by an outlet line from a plurality of received cells that have the same time stamp. An inlet circuit is provided for furthermore producing an inlet number that features the inlet circuit and that is to be supplied with each cell, and the outlet circuit is provided for establishing the correct order of successive cells based upon the time stamp and the inlet number.

9 Claims, 4 Drawing Sheets

PACKET SWITCHING SYSTEM

BACKGROUND OF THE INVENTION

1. Field of the Invention

The invention relates to a packet switching system comprising a plurality of inlet circuits which are used each for multiplying a cell coming in by an inlet line, which are provided for transmission via different switches, and for producing a time stamp to be supplied with each cell, and the system comprising a plurality of outlet circuits for selecting a cell to be conveyed by an outlet line from a plurality of received cells that have the same time stamp.

2. Discussion of the Related Art

Such a packet switching system is known from EP 0 384 936 A1, which system operates in the asynchronous transfer mode. When an asynchronous transfer mode is used in a transmission system, payload, for example, telephone, video or sound signals are sent in fixed-length packets through digital signal processing arrangements. A fixed-length packet is understood to be a cell that contains a given number of bytes (53 bytes). Each cell comprises a header field having a length of 5 bytes and an information field which accommodates the payload and has a length of, for example, 48 bytes. In such a header field are available routing indicators, error recognition data and control data. Routing indicators are meant to be understood as trunk identifiers and link identifiers. The link identifier, also referenced VCI (Virtual Channel Identifier), contains the description of the destination of the cell in the system. To transmit the cell, a virtual channel is made available in response to the virtual channel identifier. As a rule, a VCI is changed each time a switching point is reached. A trunk group of various virtual channels is referenced a virtual path. A virtual path is identified by the trunk identifier. Such a virtual path is called a virtual path identifier (VPI). Cells are assigned to consecutively determined periods of time. The length of such a period of time depends on the clock rate used as a basis of the transfer components. If no payload is available, empty cells i.e. cells without payload are transmitted in such a period of time. Cells containing payload are referenced payload cells.

In the packet switching system defined above, packets coming in by inlet lines are doubled in inlet circuits and transmitted to one of a plurality of outlet circuits via two switches. In the inlet circuit a serial number or time stamp and an additional routing indicator are added to the packet. The routing indicator, which is transmitted either via a further link or via the same link as the cell (routing indicator added to cell), indicates a virtual link between an inlet circuit and an outlet circuit. In an outlet circuit a test is made whether the packets carrying the same time stamp have been transmitted correctly. Only the packet that has been transmitted faultlessly is further processed. If the two packets have been transmitted faultlessly, either packet is further processed. In this packet switching system it is impossible for packets carrying different routes in their header fields and arriving at an outlet circuit at different instants, to be put in the right time sequence.

SUMMARY OF THE INVENTION

Therefore, it is an object of the invention to provide a packet switching system in which at least two cells carrying the same time stamp and arriving at different instants are brought back to the same time sequence.

The object is achieved by a packet switching system of the type defined in the opening paragraph, in that an inlet circuit is provided for further generating an inlet number to be co-transmitted and featuring the inlet circuit and the particular cell, and the outlet circuit is provided for establishing the correct order of successive cells based upon the time stamp and the inlet number.

In a packet switching system according to the invention, not only a time stamp, but also an inlet number of the cell to be transmitted is added in an inlet circuit. The time stamp features the instant at which a cell arrives at an inlet circuit and may be generated, for example, by a counter. The inlet number indicates the inlet line or inlet circuit through which the cell has arrived. In the inlet circuit the cell is multiplied in accordance with the number of switches and transferred to the individual switches. After passing through the switches, the cells arrive at an outlet circuit mostly at different instants. In the outlet circuit the cell is tested for containing a fault. If a cell contains a serious fault (for example, faulty information in the header field), it is rejected. If it contains a tolerable fault (for example, one faulty bit in the information field), it is further processed with the information that it is faulty. Furthermore, there is determined in the outlet circuit which cells from the cells containing the same time stamp and inlet number are transferred to the assigned outlet line. As a rule, a faultless cell is then further processed. If a plurality of cells have the same time stamp, but different inlet numbers, there is still to be established an order in which the cells for an outlet line assigned to the outlet circuit are to be read out. In contrast to said state of the art, the invention predefines a fixed delay time for individually occurring cells. As a result, a reduction of jitter is realized.

For establishing a reading order, it is necessary that cells be stored in the outlet circuit. For this purpose, the outlet circuit is provided

- for storing one cell from a plurality of faultlessly transmitted cells that have the same time stamp and inlet number,
- for storing the time stamp and the inlet number of the cell to be stored, and
- for transferring a cell that carries the oldest stored time stamp to the assigned outlet line.

If cells carrying specific time stamps are read out, there should be avoided that cells carrying these specific time stamps are processed later on in the outlet circuit. For this purpose, the outlet circuit is provided for storing a cell if this cell has arrived in the time slot that depends on the transmit instant in the inlet circuit. A faultless cell is furthermore stored in the outlet circuit only if no cell carrying the same time stamp and inlet number has been stored, or a faulty cell that carries the same time stamp and inlet number has been stored.

The outlet circuit is provided for transferring a stored cell that carries the oldest time stamp, which cell lies outside the time slot, to the assigned outlet line.

If a plurality of cells carrying the oldest time stamp, but different inlet numbers have been stored in an outlet circuit, the cells are transferred in a predefined order.

An embodiment for the outlet circuit comprises a status memory arrangement for storing the time stamp, inlet number and status of a cell, a main memory arrangement for storing the assigned cell and a control circuit for controlling the status memory arrangement and the main memory arrangement. The control circuit coordinates the reading and writing operations in the status and main memory arrangements and also checks data of a cell. The control circuit has the following tasks in that it is provided for enabling the writing of the cell, the time stamp, the inlet number and the status of the cell if stored cells do not carry the same time stamp and inlet number, enabling the writing of the cell and status of the cell in the case of a stored, faulty cell that carries the same time stamp and inlet number, enabling the status memory arrangement to determine all the main memory addresses of specific cells that lie outside the time slot, enabling the status memory arrangement to produce the main memory address of a stored cell that carries the oldest time stamp, and enabling the reading of the cell stored at the main memory address.

Furthermore, the control circuit is provided for verifying whether a cell has arrived within the time slot. A counter arrangement of the control circuit then produces the initial value and the final value of the time slot. The counter arrangement comprises a plurality of counters which are synchronized in such a way that a predefined counter indicating the difference between the initial value and final value is set. As a result of the use of time stamps and inlet numbers, less circuitry compared with the state of the art is necessary, because, for determining the right cell sequence, the stored VCI and VPI values (large tables) are not to be started from. The number of stored cells and thus the size of a Table depends on the duration of the time slot.

In an embodiment for the status memory arrangement, this arrangement comprises a status memory provided for storing the time stamps, the inlet numbers and the status of the cells, for making comparisons between stored and fed data and for transferring the result of the comparison to the control circuit. The status memory may be a Content Addressable Memory (CAM) described, for example, in U.S. Pat. No. 4,791,606. This memory produces an address, after data have been fed, and makes comparisons between stored data and fed data.

The control circuit obtains the address of a cell to be written in the main memory arrangement or a cell to be read from the main memory arrangement via operations to be performed by the status memory arrangement. The status memory arrangement thereto includes a first priority decoder for determining a main memory address for a cell to be written and a multipriority decoder for determining main memory addresses for one or more cells to be read. For determining the main memory address for a cell to be written, the status memory is used for producing a code word for a specific time stamp and specific inlet number and the first priority decoder for producing a main memory address via a decoding of the code word. For determining the main memory addresses to read one or more cells, the status memory is furthermore provided for producing a code word for a specific time stamp and the multipriority decoder is provided for producing at least a main memory address via a decoding of the code word.

These and other aspects of the invention will be apparent from and elucidated with reference to the embodiments described hereinafter.

DESCRIPTION OF THE PREFERRED EMBODIMENTS

Figure 1:
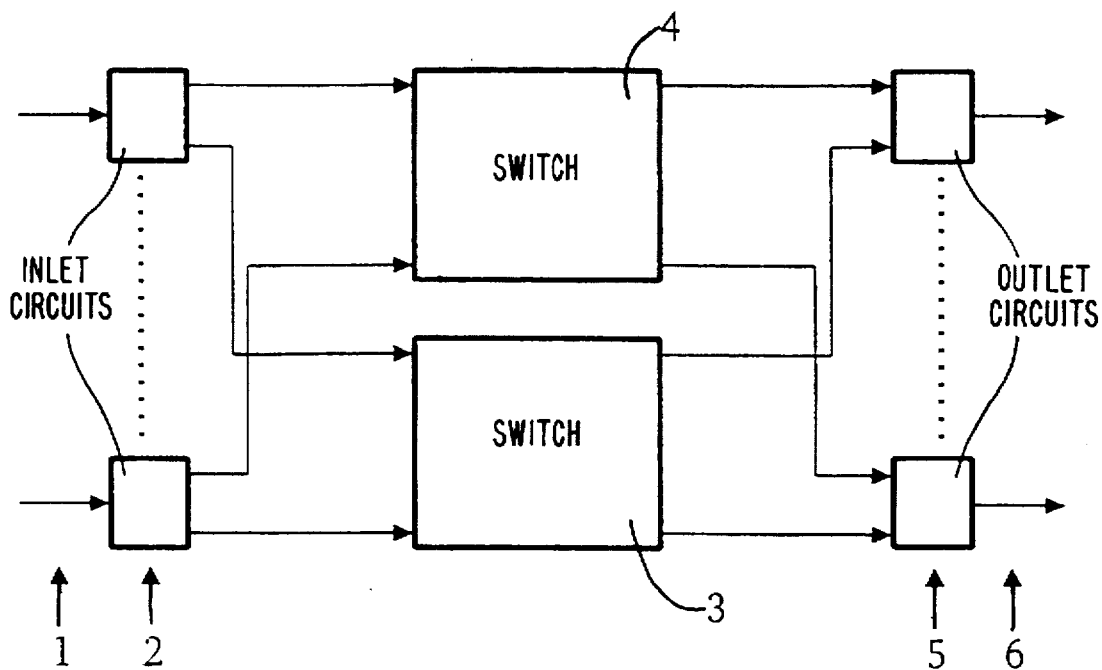
FIG. 1 gives a diagrammatic representation of a packet switching system.

FIG. 1 shows an illustrative embodiment for a packet switching system which operates in the asynchronous transfer mode and which transfer cells. The cells coming in by inlet lines 1 are fed to inlet circuits 2. An incoming cell is duplicated in an inlet circuit 2 and expanded with a routing indicator, a time stamp TS, an inlet number INO and further data. These data are appended to the cell as a tag. The two identical cells are led to outlet circuits 5 each via a switch 3 and 4. The cells may then pass through various paths in the two switches 3 and 4 and in this way it is possible that the two identical cells do not simultaneously arrive at an outlet circuit 5. The correct time sequence of the cells is restored in an outlet circuit 5 and a substantially faultless cell is transferred to the outlet lines 6 connected to the outlet circuits 5 to be further processed. Only the cells containing certain tolerable faults are transferred. If, for example, one bit in the information field is faulty, this cell is tolerated. Only in the case of serious faults will the cell not be switched any further.

Figure 2:
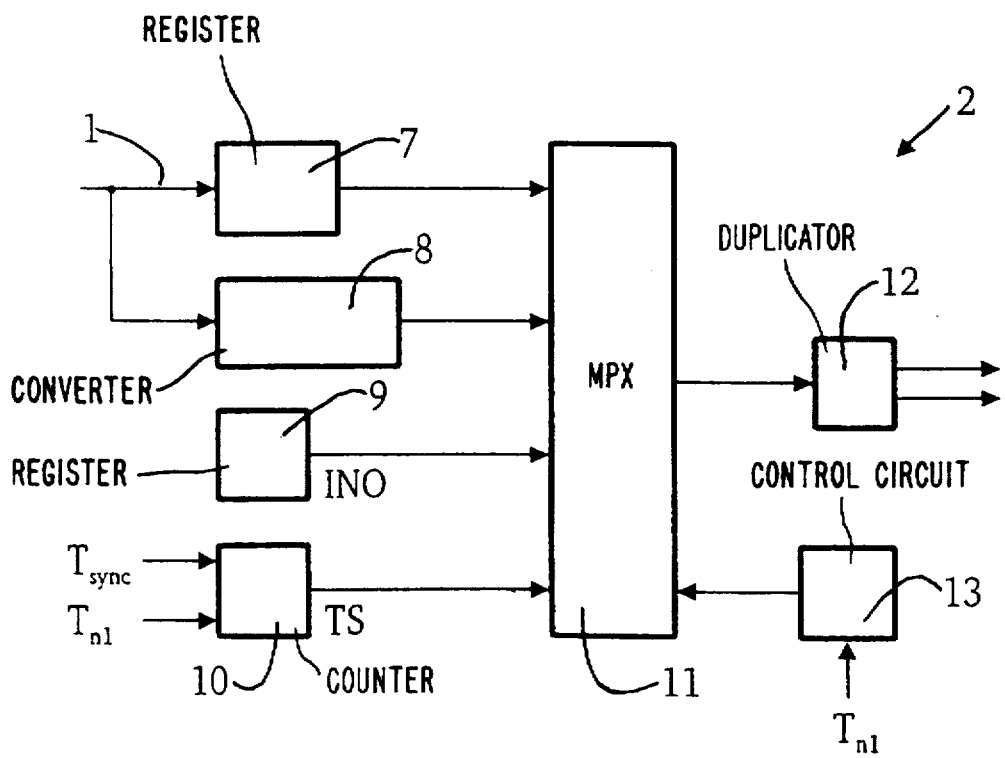
FIG. 2 shows an inlet circuit used in the packet switching system shown in FIG. 1.

In FIG. 2 is shown an illustrative embodiment for an inlet circuit 2. The circuit contains a register 7 for buffering a cell that arrives by an inlet line 1, a converter circuit 8 which converts the information contained in the header field of the cell at least into a routing indicator, a further register 9 in which the inlet number INO particular for the inlet circuit is stored, a counter 10 which generates a time stamp TS at each occurrence or buffering of the cell in the register 7, and a multiplexer 11 which switches the outlets of the registers 7, and 9; of the converter circuit 8, and of the counter 10 to a duplicator 12. The multiplexer 11 is controlled by a control circuit 13 which receives a clock signal $T_{n1}$. The clock signal $T_{n1}$ is synchronized with the occurrence of a cell. The duplicator 12 supplies identical cells to the switches 3 and 4. The inlet number INO stored in register 9 indicates the inlet line 1 by which the cell has arrived. The counter 10 is reset at specific instants by the management clock $T_{sync}$ generated by a higher-order management system, and timed with the local clock signal $T_{n1}$ which calls forth an edge relevant to the further counting in the counter 10 when a cell occurs. The routing indicator which is added in the converter circuit 8 indicates the destination or outlet circuit 5 respectively, to which the cell is to go.

Figure 3:
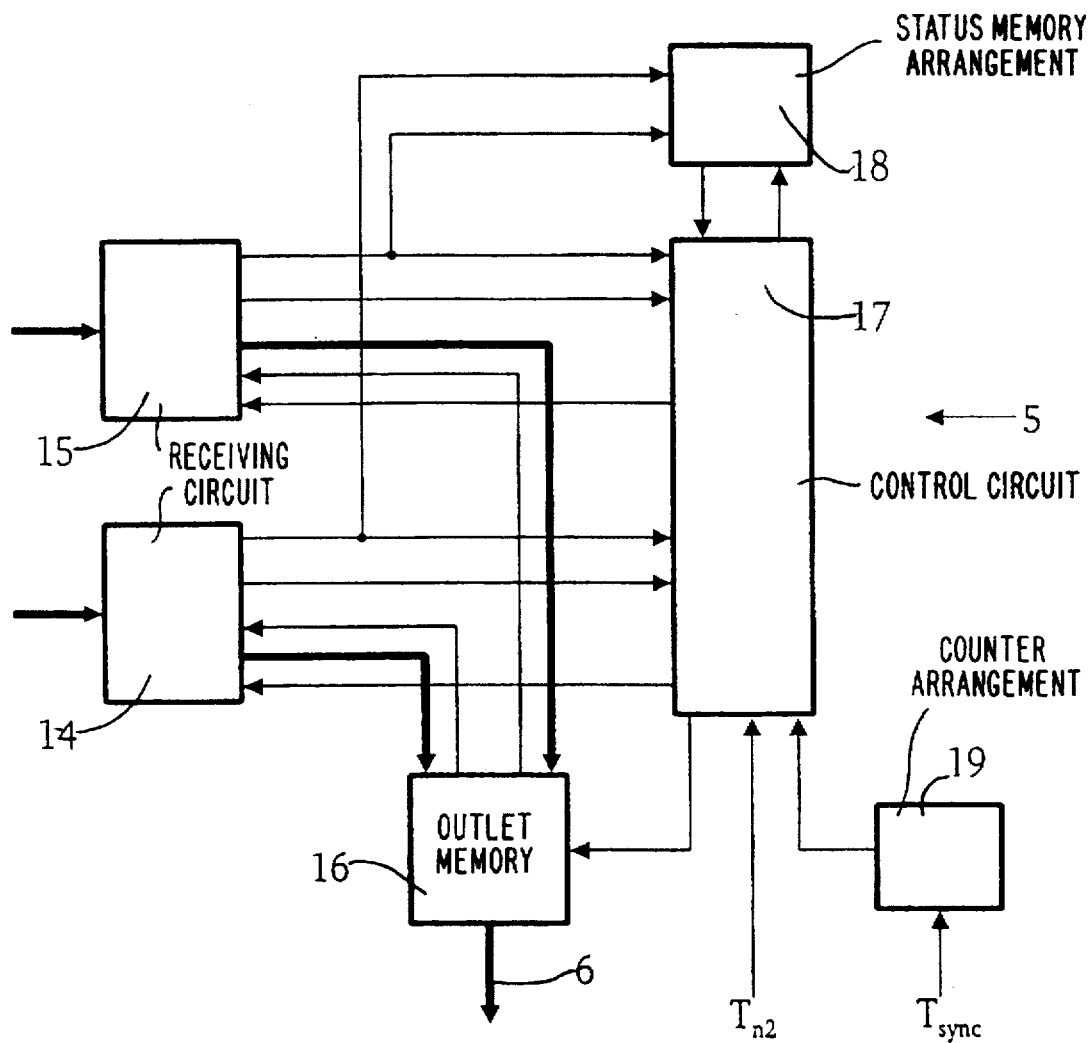
FIG. 3 shows an outlet circuit used in the packet switching system as shown in FIG. 1.

An outlet circuit 5 (FIG. 3) comprises two receiving circuits 14 and 15. The receiving circuit 14 is connected to an output of the switch 3 and the receiving circuit 15 to an output of switch 4. Certain largely faultlessly received cells are transferred by the receiving circuits 14 and 15 to an outlet memory arrangement 16 included in the outlet circuit 5 and passed on to an outlet line 6 by the outlet memory arrangement 16 at specific instants given by a control circuit 17. In addition, the outlet circuit 5 includes a status memory arrangement 18 and a counter arrangement 19.

Figure 4:
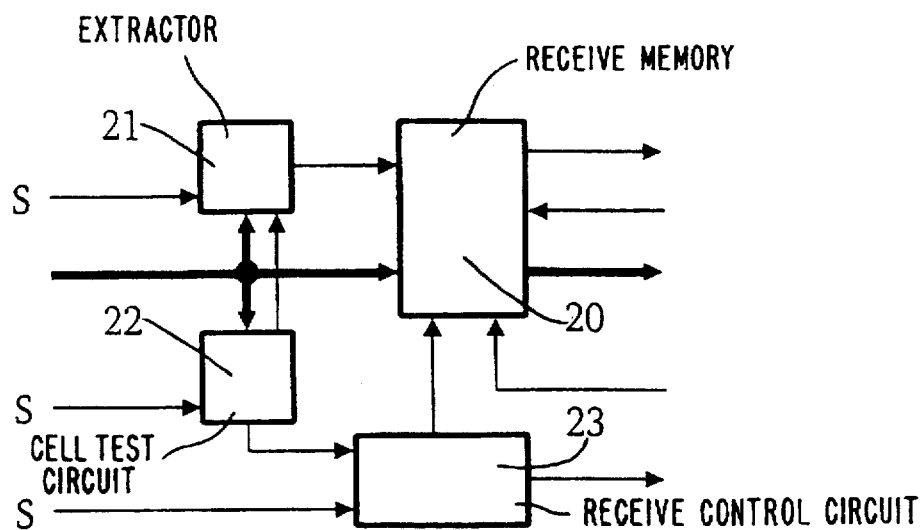
FIG. 4 shows a receiving circuit used in an outlet circuit shown in FIG. 3.

An illustrative embodiment of a receiving circuit 14 or 15 is shown in more detail in FIG. 4. Such a receiving circuit 14 or 15 receives a cell stream from a switch 3 or 4 and, for example, a synchronizing pulse S which indicates the beginning of a cell. The synchronizing pulse S can also be recovered from the cell stream from a circuit (not shown). When a synchronizing pulse S occurs, a cell is written in a receive memory 20 and the cell is further applied to an extractor 21 and a cell test circuit 22. The extractor 21 and the cell test circuit 22 take specific bits from the cell. The extractor 21 takes the time stamp TS, the inlet number INO and a status signal CSF (Cell Status Field) from the cell. The cell status field CSF is set to logic "1" when the information is faulty and logic "0" when it is not.

In the cell test circuit 22, tests are made with certain bits provided for test purposes, whether the information in the header field and in the information field of the cell has been transmitted faultlessly. The cell test circuit 22 sends the test signal to the extractor 21 and to a receive control circuit 23. This receive control circuit 23 also receives the synchronizing pulse S and controls the writing operation in the receive memory 20. If the test in the cell test circuit 22 has shown that the cell contains a serious fault, the memory location accommodating the cell is again declared free. Alternatively, if the cell has been transmitted largely faultlessly, the memory location continues to be occupied. If a cell has been stored in the receive memory 20, and considered occupied, the receive control circuit 23 sends out a ready pulse to the control circuit 17.

The extractor 21 receives the test information from the cell test circuit 22. If the cell is faulty, the status signal CSF, if not logic "1" (fault has been previously detected), is set to logic "1". Otherwise it retains its previous status. The extractor 21 furthermore sends the information signals taken from the cell to the receive memory 20 which buffers these information signals. In addition, the extractor applies information signals I0 and I1 to the receive memory 20. If a cell has been received from the receiving circuit 14, I0 is set to logic "1" and I1 is set to logic "0". Alternatively, if the receiving circuit 15 has received the cell, I0 is set to logic "0" and I1 is set to logic "1". Analogously, two status signals CSF0 and CSF1 are buffered in the receiving memory. If a cell has been received from the receiving circuit 14, CSF1 is logic "0" and the status signal CSF0 depends on whether the cell is faulty or not. When a cell is received from the receiving circuit 15, the status signals are occupied conversely. CSF0 is in that case logic "0" and the value of CSF1 depends on whether the cell is faulty or not.

The receive memory 20 receives a first enable pulse from the outlet memory arrangement 16 when the receive memory demands the buffer cell to be written. The receiving circuit 20 also receives an enable pulse from the control circuit 17 when the further information signals are to be evaluated. They are then transferred to the status memory arrangement 18 and to the control circuit 17.

Figure 5:
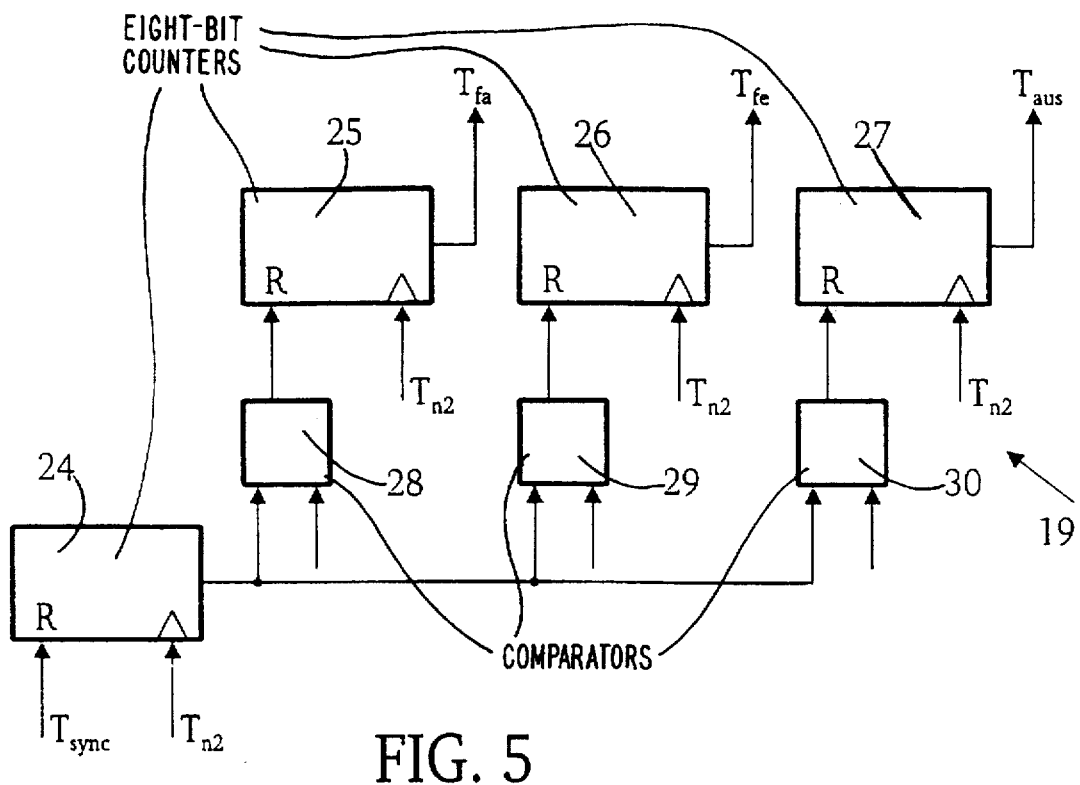
FIG. 5 shows a counter arrangement used in an outlet circuit shown in FIG. 3.

FIG. 5 shows an illustrative embodiment for the counter arrangement 19. It comprises, for example, four eight-bit counters 24, 25, 26 and 27 and three comparators 28, 29 and 30. The counter 24 is reset with each pulse of the management clock $T_{sync}$ generated by the management system. The counter 24 is timed with a local clock signal $T_{n2}$, which results in a pulse when a cell occurs. A pulse of the management clock $T_{sync}$ occurs, for example, after the counter 24 has counted two hundred and fifty times. This provides a synchronization of the management clock $T_{sync}$ generated by the management system with the local clock $T_{n2}$. Such a synchronization also occurs in other arrangements of the packet switching system, even though they are not explicitly mentioned. Such a synchronization is necessary, because the clock signals are generally produced by different spatially arranged clock supply arrangements.

The comparator 28 applies a reset pulse to the counter 25 when the count of counter 24 has reached a count of, for example, 20. The value 20 consists of a constant minimum delay $D_{const}$ of a switch 3 or 4 derived at the instant of the last pulse of the management clock $T_{sync}$. A counter 25 generates counts $T_{fa}$ and is also timed with the clock signal $T_{n2}$. The counter 26 receives a reset pulse from the comparator 29 when the count of the counter 24 has reached a value of, for example, 100. The value 100 consists of the value $D_{const}$ and a permissible maximum delay $D_{max}$. The counter 26 generates counts $T_{fe}$. A further comparator 30 compares the count of counter 24 with a value that consists of the value $D_{const}$, the value $D_{max}$ and a time delay $\Delta T$. When this value (for example, 105) is reached, the counter 27 which produces counts $T_{aus}$ is reset via a reset pulse from comparator 30.

The counters 25 and 26 nominally have each a difference of 80 counts. These 80 counts represent a time slot in which a cell is to arrive at the outlet circuit 5. The counter 25 indicates an initial value $T_{fa}$ for a cell having the time stamp TS and the counter 26 a final value $T_{fe}$. If the cell that has arrived lies outside this time slot, it is not processed, as will be explained hereafter. The counter 27 produces the value $T_{aus}$, which value indicates the time stamps of the cells to be read from the output memory arrangement.

The control circuit 17 (FIG. 3) receives from the counter arrangement 19 the counts $T_{fa}$, $T_{fe}$ and $T_{aus}$ as well as the local clock signal $T_{n2}$ which indicates a new cycle for processing received cells. After a cell from the two receiving circuits 14 and 15 has been processed, and after the ready pulse has been received from a receive control circuit 23 of a receiving circuit 14 or 15, the control circuit 17 demands, via an enable pulse, the next cell for processing. The read and write operations from/in the output memory arrangement 16 are controlled by the control circuit 17. The control circuit 17 furthermore enables the receive memories 20 in the receiving circuits 14 and 15 for applying the time stamp TS, the inlet number INO, the status signals CSF0 and CSF1 and the further information signals I0 and I1 to the status memory arrangement 18. The control circuit 17 also receives these information signals. On the basis of the time stamp TS the control circuit 17 checks whether the cell has arrived within the time slot. If it has, various measures to be described hereafter are carried out in the control circuit 17. Subsequently, a new cell (packet) is accommodated in a memory cell in the output memory arrangement 16, as required.

Figure 6:
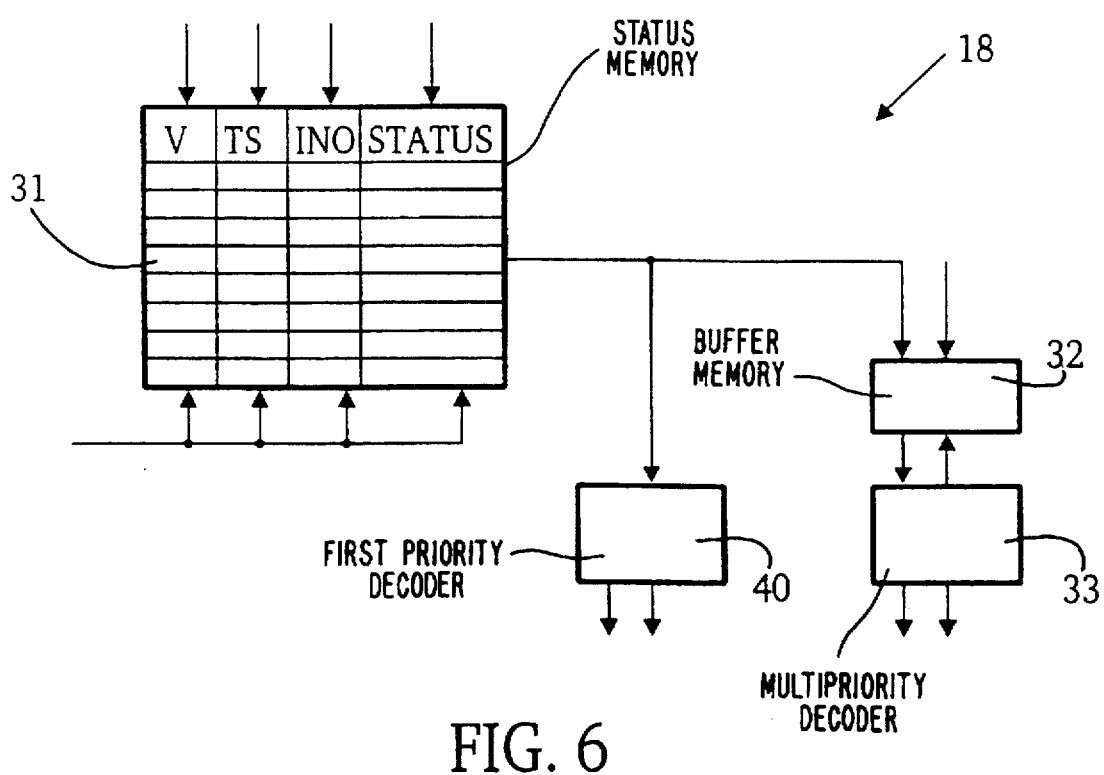
FIG. 6 shows a status memory arrangement used in an outlet circuit shown in FIG. 3.

FIG. 6 shows an illustrative embodiment for a status memory arrangement 18 which comprises a status memory 31, a first priority decoder 40, a buffer memory 32 (FIFO) and a multipriority decoder 33. The status memory 31 may be a Content Addressable Memory CAM which is further described, for example, in U.S. Pat. No. 4,791,606. This memory produces or stores data after an address has been fed. The status memory 31 can further perform comparing operations.

In the following, the operations running in the status memory arrangement 18 and the control circuit 17 will be explained irrespective of the origin (receiving circuit 14 or 15) of the cells.

As described above, the control circuit 17 first enables the status memory arrangement 18 to compare data. First a time stamp and inlet number of a receiving circuit 14 or 15 are applied to the status memory 31 and a check is made whether an identical entry exists in a memory cell. For each memory cell the status memory 31 produces a 1-bit comparison result. The total of the comparison results forms a code word which is applied to the first priority decoder 40 to be decoded. When the status memory 31 contains, for example, 8 memory cells, and the second memory cell contains the identical entry, the code word "01000000" is switched to the first priority decoder 40.

The first priority decoder 40 forms an address from the code word when at least one comparison result has yielded the same time stamp and inlet number. Furthermore, the first priority decoder 40 produces a result signal which indicates whether a like time stamp and inlet number have been found. A priority decoder is a 1-from-n decoder which is further described in the title "Halbleiter-Schaltungstechnik" by U. Tietze and Ch. Schenk, 9$^{th}$ impression, 1990, Springer-Verlag, pp. 228 and 229. If no such time stamp and inlet number have been found, via a write signal, control circuit 17 causes the time stamp, the inlet number INO, the status signals CSF0 and CSF1 and the further information signals I0 and I1 to be written at empty memory locations. The empty memory locations are stored, for example, in a memory (not further shown), controlled by the control circuit 17. An occupied memory location is featured by a logic "1" of a validity bit V. The status signals CSF0 and CSF1 and the further information signals I0 and I1 are written in the STATUS field of the memory location.

If, however, a like time stamp and inlet number have been found, the first priority decoder 40 supplies an address to the control circuit 17. The control circuit 17 accesses the status memory 31 for a reading operation and receives the stored status signals CSF0 and CSF1 and the further information signals I0 and I1. Subsequently, the control circuit 17 performs comparing operations. For this purpose, three cases are to be distinguished:

1) There is assumed that the cell comes from the receiving circuit 14 i.e. the received information I0 is logic "1" and the entry in the memory location is also I0="1". The cell is then not processed any further. The entry in the status memory 31 and the memory location in the output memory arrangement 16, which contains the cell for the tested time stamp and inlet number, is released. The validity bit V in the status memory 31 is set to "0". The analogous method holds for a cell coming from the receiving circuit 15.

2) In the second case there is assumed that the cell comes from the receiving circuit 14. In the status memory 31 are stored for the assigned time stamp and inlet number I0="0", I1="1", CSF1="0" (cell is faultless) and an optional CSF0. A cell (I0="1") coming from receiving circuit 14 is not stored in the outlet memory arrangement 16. There, the same cell stored by the receiving circuit 15 is retained. There is only one memory location available for the two cells in the outlet memory arrangement 16. The control circuit 17 thus sends no write command to the outlet memory arrangement 16. For this purpose, however, the control circuit 17 sends a write command to the status memory 31 to write the status signal CSF0 and the further information signal I0 at the associated memory location. Also the associated address is transmitted. The analogous method holds for a cell coming from the receiving circuit 15.

3) In the third case there is also assumed that the cell comes from the receiving circuit 14. The status memory contains under the searched time stamp and inlet number I0="0", I1="1", CSF1="1" (cell is faulty) and an optional CSF0. Based on the stored faulty cell, a cell (I0="1") coming from the receiving circuit 14 is stored in the outlet memory arrangement 16. For this purpose, the control circuit 17 produces a write command and the decoded address. The faulty stored cell is then overwritten. The status signal CSF0 and the further information signal I0 are written in the status memory 31. The associated address is then co-transmitted. The analogous method holds for a cell coming from the receiving circuit 15.

In the third case, if the second cell is also faulty (CSF0="1"), the memory location could again be released and the second cell could not be processed any further either.

For a cell to be conveyed to the assigned outlet line, the control circuit 17 and the status memory arrangement 18 carry out further control operations. The control circuit 17 searches via the status memory arrangement 18 for all the cells whose time stamps are equal to $T_{aus}$. This time stamp, which is equal to $T_{aus}$, is fed to the status memory 31 and only the field in each memory location containing the time stamp is released for the comparison. The resulting code word with the 1-bit comparison signals is buffered in the buffer memory 32. The buffer memory 32 receives a write command from the control circuit 17 under the assumption that at least one 1-bit comparison signal is logic "1". For this purpose, the control circuit 17 evaluates the result signal from the first priority decoder 40. If such a test were not performed, the buffer memory 32 would overflow.

The multipriority decoder 33 decodes the code word buffered in the buffer memory 32 and produces all the addresses for reading the cells from the output memory arrangement 16. The multipriority decoder 33 applies also to the control circuit 17 a result signal which gives information on whether an address has been found.

Figure 7:
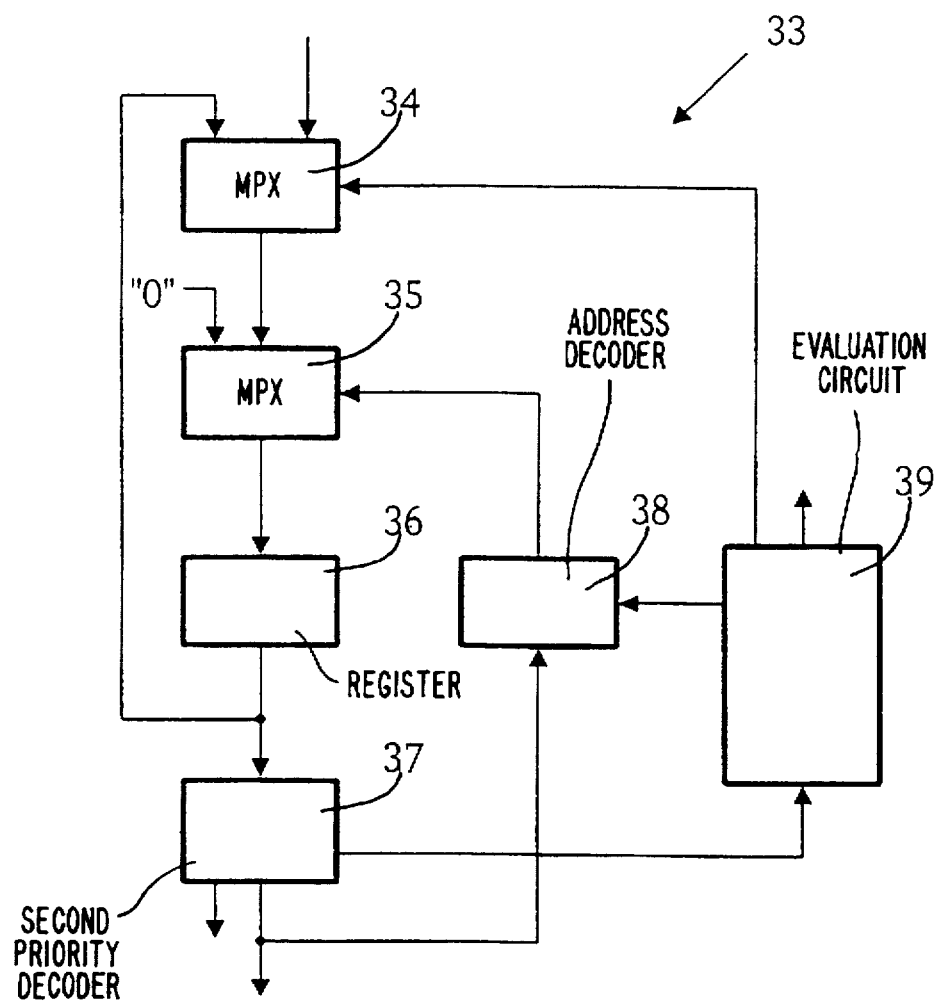
FIG. 7 shows a priority decoder used in the status memory arrangement shown in FIG. 6.

An illustrative embodiment for the multipriority decoder 33 is shown in FIG. 7. It comprises two multiplexers 34 and 35, a register 36, a second priority decoder 37, an address decoder 38 and an evaluation circuit 39. The evaluation circuit 39 controls the reading from the buffer memory 32 and the decoding process. In the multiplexer 34, a code word is read from the buffer memory 32 in response to a read signal from the evaluation circuit 39. In response to a command from the evaluation circuit 39, after a new code word has been applied, the address decoder 38 switches the multiplexer 35, so that the multiplexer conveys the code word received from the buffer memory 32 to the register 36. The code word written in the register 36 is applied to the second priority decoder 37. The second priority decoder 37 works similarly to the first priority decoder 40 and produces an address when at least one position of the code word is logic "1". If there are more logic "1's" at various positions, an address is formed for the first position that is a logic "1" after a given sequence. This address is fed to the control circuit 17 and also to the address decoder 38. The address decoder 38 controls the multiplexer 35, so that a logic "0" is inserted at the position of the code word from which the last address has been formed. After the second priority decoder 37 has detected at least two logic "1's" in the code word stored in the register 36, the priority decoder sends a result signal containing the particular information to the evaluation circuit 39. The evaluation circuit 39 then switches the multiplexer 34 so that the code word stored in register 36 is taken by multiplexer 34 to multiplexer 35. The multiplexer 35 inserts a logic "0" at a position predefined by the address decoder 38, so that the register 36 is supplied with a new code word reduced by a logic "1". When the code word has not more than a single logic "1" left, the evaluation circuit 39 is informed thereof via the result signal. With the next reading cycle, a new code word is taken from the buffer memory 32 and the cycle is resumed.

After receiving an address, the control circuit 17 gives a read command and the address to the outlet memory arrangement 16. This arrangement 16 then supplies the cell to the assigned outlet line 6.

The control circuit 17 can be manufactured as a processor module, or as a user-specific integrated circuit. The mode of operation of the control circuit 17 can be described by the following control run:
1) Evaluation of the Data from Receiving Circuit 14:
Has a ready pulse been received from receiving circuit 14?
Yes: An enable pulse is given to receiving circuit 14 to feed time stamp TS, inlet number INO, status signals CSF0 and CSF1 and further information signals I0 and I1 to the status memory arrangement 18 and the control circuit 17;

Counts $T_{fa}$ and $T_{fe}$ are received from counter arrangement 19;
Has cell arrived within time slot?
No: Cell is rejected;
Yes: Status memory arrangement 18 is enabled to compare data;

Have data been received from status memory arrangement 18?
Yes:
  a) No like time stamp and inlet number found: A write signal is applied to status memory arrangement 18 to write time stamp TS, inlet number INO, status signals CSF0 and CSF1 and further information signals I0 and I1;
  b) Like time stamp and inlet number found: Production of an address of status memory arrangement 18, of the time stamp TS stored at this address, inlet number INO, status signals CSF0 and CSF1 and further information signals I0 and I1;

Comparisons are made: Is received information signal I0="1" and stored information signal I0="1"?
Yes: Entries in status memory 31 and cell in outlet memory arrangement 16 are erased for specific time stamp and inlet number;

Is received information signal I0="1", stored information signals I0="0" and I1="1" and status signal CSF1="0"?
Yes: The received information signals CSF0 and I0 are stored in status memory 31;

Is received information I0="1", stored information signals I0="0" and I1="1" and status signal CSF1="1"?
Yes: The received information CSF0 and I0 is stored in the status memory 31 and the associated cell in outlet memory arrangement 16;
2) Evaluation of the Data from Receiving Circuit 15:
3) Transmission of a Cell from Outlet Memory Arrangement 16:
Control command to status memory arrangement to search for the time stamps TS that are equal to $T_{aus}$;
Result signal received from first priority decoder 40:
Has evaluation of the result signal shown that at least one cell carrying the time stamp TS is equal to $T_{aus}$?
Yes: A write command is given to the buffer memory 32 to write the code word;
  Result signal is received and possibly an address from multipriority decoder 33;
  Has an address been received?
  Yes: A read command and the address are given to outlet memory arrangement 16;
The control circuit 17 learns the beginning of a cycle from the clock signal $T_{n2}$. A cycle is subdivided into three sub-cycles. First the data are processed by the receiving circuit 14 and written, as required, in the status memory 31 and the outlet memory arrangement 16, after that, in an analogous manner, the data from the receiving circuit 15 and, finally, a cell is transmitted from the outlet memory arrangement, when at least one cell is stored in the outlet memory arrangement 16. The individual items of the control run have already been explained in the previous description. The control run relating to the processing of data of receiving circuit 15 has an analogous pattern to the control run relating to the evaluation of the data of receiving circuit 14.

We claim:

1. A packet switching system comprising:
  a plurality of inlet circuits, each inlet circuit adapted for multiplying a cell coming in by an inlet line and for producing a time stamp to be supplied with each cell;
  first and second switches, said switches each having inputs connected to outputs of said plurality of inlet circuits; and
  a plurality of outlet circuits each having inputs connected to outputs of said first and second switches for selecting a cell to be conveyed by an outlet line from a plurality of received cells that have a same time stamp, wherein each inlet circuit further comprises means for further generating an inlet number to be co-transmitted and featuring the respective inlet circuit and a particular cell, and wherein each outlet circuit further comprises means for establishing a correct order of successive cells arriving at different instants based upon the time stamp and the inlet number.

2. The packet switching system as claimed in claim 1, wherein each outlet circuit further comprises
  means for storing one cell from a plurality of faultlessly transmitted cells that have a same time stamp and inlet number,
  means for storing the time stamp and the inlet number of the cell to be stored, and
  means for transferring a cell that carries an oldest stored time stamp to an assigned outlet line.

3. The packet switching system as claimed in claim 2, wherein said means for storing one cell further comprises storing a cell when
  the cell has arrived in a time slot, wherein the time slot depends on a transmission instant in a respective inlet circuit and further when
  no cell carrying the same time stamp and inlet number has been stored or a faulty cell carrying the same time stamp and inlet number has been stored.

4. The packet switching system as claimed in claim 3, wherein said means for transferring a stored cell carrying an oldest time stamp further comprises transferring a stored cell carrying the oldest time stamp lying outside the time slot to the assigned outlet line.

5. The packet switching system as claimed in claim 4, wherein said means for transferring a stored cell carrying an oldest time stamp still further comprises, in the event of a plurality of stored cells having the oldest time stamp but different inlet numbers, means for transferring the cells in a predetermined order.

6. The packet switching system as claimed in claim 2, wherein each outlet circuit further comprises (i) a status memory arrangement for storing the time stamp, the inlet number and a status of a cell, (ii) a main memory arrangement for storing an assigned cell and (iii) a control circuit for controlling the status memory arrangement and the main memory arrangement, wherein the control circuit comprises
  means for enabling the writing of the cell, the time stamp, the inlet number and the status of the cell if stored cells do not carry the same time stamp and inlet number, means for enabling the writing of the cell and status of the cell in the case of a stored, faulty cell that carries the same time stamp and inlet number, means for enabling the status memory arrangement to determine all main memory addresses of specific cells that lie outside the time slot, means for enabling the status memory arrangement to produce the main memory address of a stored cell that carries the oldest time stamp, and means for enabling the reading of the cell stored at the main memory address.

7. The packet switching system as claimed in claim 6, wherein the control circuit further comprises means for testing whether a cell has arrived in the time slot, and further wherein each outlet circuit further comprises a counter arrangement for applying the initial value and the final value of the time slot to the control circuit.

8. The packet switching system as claimed in claim 7, wherein the status memory arrangement further comprises a status memory (i) for storing the time stamps, the inlet numbers and the status of the cells, (ii) for making comparisons between stored and fed data, and (iii) for transferring the results of the comparisons to the control circuit.

9. The packet switching system as claimed in claim 8, wherein the status memory arrangement still further comprises a first priority decoder for determining a main memory address for a cell to be written and a multipriority decoder for determining main memory addresses for one or more cells to be read, wherein, for determining the main memory address for a cell to be written, the status memory further comprises means for producing a code word for a specific time stamp and specific inlet number and the first priority decoder comprises means for supplying a main memory address via a decoding of the code word, and wherein, for determining the main memory addresses to read one or more cells, the status memory further comprises means for producing a code word for a specific time stamp and the multipriority decoder comprises means for producing at least a main memory address via a decoding of the code word.

* * * * *